March 22, 1966 A. H. RICHARDSON ET AL 3,241,581
DELIVERY CHUTE
Filed Nov. 30, 1962

INVENTORS
ALAN H. RICHARDSON
JOSEPH BRESLOVE, JR.
BY
ATTORNEY

United States Patent Office 3,241,581
Patented Mar. 22, 1966

3,241,581
DELIVERY CHUTE
Alan H. Richardson, Kingsville, Ohio, and Joseph Breslove, Jr., Pittsburgh, Pa., assignors to Union Carbide Corporation, a corporation of New York
Filed Nov. 30, 1962, Ser. No. 241,232
3 Claims. (Cl. 141—93)

This invention relates to a delivery chute for transferring bulk materials and refers more particularly to a delivery chute which provides means for collecting and removing dusts which are generated during the delivery of such material.

Transferring bulk materials such as coal, powdery chemicals, vegetable grains, minerals, and like granular materials can be dangerous if toxic dusts or dusts which form explosive mixtures with air are generated and not effectively confined and collected.

It is the principal object of the invention to provide a dustless delivery chute which permits the delivery of bulk granular material without the danger of creating explosive dust mixtures or noxious and/or toxic atmospheres.

It is another object to provide a delivery chute which is extendable so as to be adaptable for delivering materials to railroad cars, trucks, storage bins and the like.

Still another object is to provide a delivery chute which is adaptable to manual, semi-automatic or automatic operation.

The objects of the invention are achieved by a telescoping concentric tubular device comprising an inner set of extensible tubes and a flexible concentric outer tube. The annulus formed by the space between the inner and outer tubes serves to convey the dust which is generated when delivering bulk materials through the inner tube. The upper end of the outer tube is connected to a dust recovery system which serves to separate and salvage the dust particles which rise upwardly through the annulus due to a draft provided therein.

Figure 1:
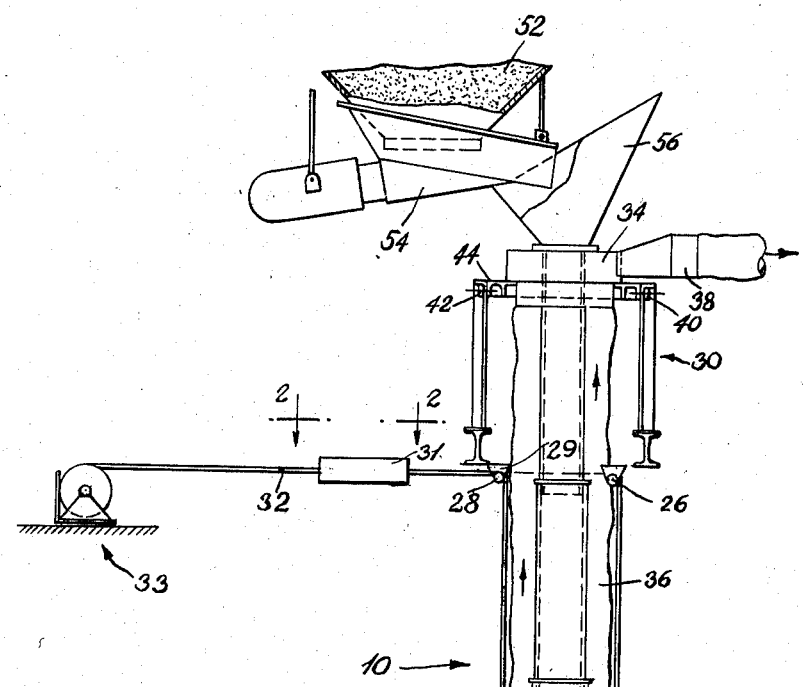
Figure 2:
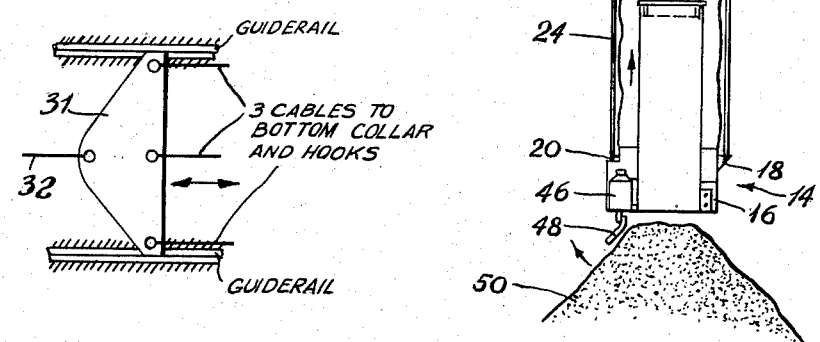

The manner in which the objects of the invention are accomplished will become more apparent from the description and accompanying drawing, in which FIGURE 1 is a side elevation view of the delivery chute of the invention and FIGURE 2 is a partial plan view of the apparatus along lines 2—2 of FIGURE 1.

According to the invention, there is shown a delivery chute 10 having an inner conduit or tube 11, preferably provided with means for axially extending it in a telescopic fashion. Disposed about the inner tube 11 is an outer tube 12, which is preferably a flexible like bellows and is extensible. Suitably, the outer tube 12 can be fabricated from a flexible material such that its height can be adjusted according to the height of the telescoping inner tube 11 in a pleated or accordian fashion. Attached by suitable means to the lower end 14 of the inner tube 11, is a tubular bottom collar 16. The outer tube 12 is secured to and sealed about the periphery of the bottom collar 16. The bottom collar 16 is provided with a plurality of hooks mounted 120° apart 18 and 20. In the preferred embodiment of the invention, three hooks are utilized. The hooks are attached to a plurality of hoisting cables 22 and 24 for raising and lowering the tubes 11 and 12. The hoisting cables pass over a plurality of sheaves or fixed pulleys 26 and 28 located at about the level of the fixed or upper end 30 of the tubes 11 and 12, and they are secured to a fixed yoke or equilateral plate 29 (partially shown). The three hoisting cables, two of which are denoted as 22 and 24, are connected to a translatable equalizing bar 31 which is in turn connected by a single cable 32 to a drum and motor assembly 33 which is mounted apart from the delivery chute 10 of the invention. The hoisting cables may be chains, conventional cables, ropes or the like. The function of the equalizing bar 31 is to allow for any minor inequalities or variations so that the pull of the drum and motor assembly 33 (hoist) would be equally divided among the three hoisting cables. Thus, no one cable would get ahead of the other two and therefore the telescopic tubes could not twist or jam up.

Attached by suitable means to the upper end 30 of the inner tube 11, is a tubular upper collar or exhaust outlet 34 which is also secured to the outer tube 12. The exhaust outlet 34 serves as a connecting medium between the annulus 36 formed between the inner and outer tubes 11 and 12 and a horizontal duct 38 running to a dust recovery system (not shown). The dust recovery system may comprise a suitable suction fan, for creating an updraft in the annulus 36, as shown by the arrows, and a dust separating unit for culling out the dust particles and salvaging them. The exhaust outlet 34 is primarily supported on trunnions 40 and 42 which form part of a gimbaled platform 44, thereby enabling the tubes 11 and 12 to be pivoted thereabout suitably in two axes or manipulated laterally in such a manner so as to be able to distribute the lading of a railroad car. This gimbal mounting provides the delivery chute 10 with the necessary flexibility to permit distributing the lading uniformly, for example, along the length and width of the railroad car, or other container.

There is also secured to the lower end 14 of the inner tube 11, a sensing switch 46 having a gravity actuated lever arm 48 which automatically adjusts the vertical position of the tubes 11 and 12 to a higher level as the bulk material being delivered is piled up. If desired, the lever arm 48 may be spring actuated. The sensing switch 46 is electrically connected to the drum and motor assembly 33 by means of a control circuit system (not shown). When the piled up material 50 actuates the lever arm 48 by deflecting and pivoting it a particular arc distance, the sensing switch 46 closes a circuit of the control system and the drum and motor assembly 33 are caused to operate thus raising the tubes 11 and 12 to a height from the pile 50 such that the lever arm 48 drops back to its original unactuated position. This procedure is automatic and will operate in a continuous manner until a railroad car or the like is filled up to a desired level. The lever arm 48 is of a design such that it provides a predetermined spaced relation between the pile 50 and the tubes 11 and 12 which is necessary for maintaining good airflow and dust collection.

The outer tube 12 is preferably reinforced with spring wire hoops (not shown) at spaced intervals in order to inhibit and preclude collapse of the outer tube by atmospheric pressure. In order to improve wear resistance and reduce permeability of the outer tube 12, the internal surfaces may suitably be coated with neoprene or the like.

In operation, the delivery chute 10 is positioned between a typical storage bin 52, vibratory feeder 54 and an empty railroad car or the like. The vibratory feeder 54 dispenses the bulk material into a cone like member 56 which is used for directing the material to the inner tube 11 of the delivery chute 10. A manually operated switch (not shown) is also electrically connected into the circuit control system and this switch when in use causes the sensing switch to be inoperative. Thus, one is able to raise the delivery chute 10 to a clearance position for positioning a particular container beneath the chute or to remove said container after filling it up.

When power is applied to the circuit control system and the manual raise switch is placed in the forward-tract automatic control position, the delivery chute assembly 10 will be lowered into position automatically until the downward travel of the chute 10 causes the lever arm 48 to touch the bottom of the container to be filled. As this occurs, the downward travel of the chute 10 will cease since the lever arm 48 will be actuated thereby causing the sensing switch 46 to be activated thus the drum and motor assembly 33 will begin to now raise the chute 10 slightly such that the lever arm 48 falls back to its original unactuated position as it was prior to touching the bottom of the container. The dust collection system is then started and the dispensing of the bulk material is commenced. Any dust that is generated during passage of the material through the inner tube 11 or by impact when the material hits the pile being formed beneath the inner tube is trapped by and sucked up into the surrounding annulus 36.

When the container has been filled to a desired level, the dispensing of material is terminated, the dust collection system is stopped and the manual raise switch is turned to the reverse-retract position. Thus, the delivery chute assembly is raised to a position sufficient to clear the container as it is moved from beneath the delivery chute. The dust collection system safely separates and recovers the dust particles thus precluding noxious and toxic surroundings and eliminates the danger of forming explosive mixtures with the atmosphere.

What is claimed is:

1. A dustless delivery chute for transferring bulk granular material comprising a plurality of tubes telescopically mounted together, an extensible outer tube larger than the largest diameter of said plurality of tubes and coextensive therewith and disposed about same such that an annulus is formed therebetween, an exhaust outlet communicating with the upper end of said annulus and to means for creating a draft in said annulus, and means for regulating the lowermost end of said tubes from said bulk granular material being transferred; said regulating means comprising a drum and motor assembly, a plurality of cables secured to the lowermost end of said tubes and passing over associated pulleys which are mounted to a fixed member near the uppermost end of said tubes, a translatable equalizing bar, a sensing switch having an actuating lever arm which is responsive to the flowing movement of said granular material as it is transferred and deposited beneath said tubes, and a cable connecting said motor and drum assembly to said equalizing bar, said plurality of cables terminating at said equalizing bar such that as said cable is wound about said drum of said drum and motor assembly said tubes are raised and lowered, said equalizing bar maintaining an equal pulling force on all of said cables thereby precluding the twisting and jamming of said telescopically mounted tubes.

2. The dustless delivery chute of claim 1 wherein said actuating lever arm of said sensing switch is of a gravity type.

3. The dustless delivery chute of claim 1 wherein said actuating lever arm of said sensing switch is spring actuated.

References Cited by the Examiner

UNITED STATES PATENTS

| 2,075,931 | 4/1937 | Eades. | |
| 2,080,977 | 5/1937 | Albrecht | 214—17.6 |
| 2,524,560 | 10/1950 | Cote | 141—93 |
| 2,544,576 | 3/1951 | Weber | 214—17.6 |
| 2,874,733 | 2/1959 | Sesler | 141—93 |

FOREIGN PATENTS

| 406,263 | 2/1934 | Great Britain. |
| 459,899 | 1/1937 | Great Britain. |

LAVERNE D. GEIGER, *Primary Examiner.*

ANDRES H. NIELSEN, *Examiner.*